Nov. 21, 1939.   H. J. NESS   2,181,094
METALLURGICAL PROCESS
Original Filed May 19, 1937
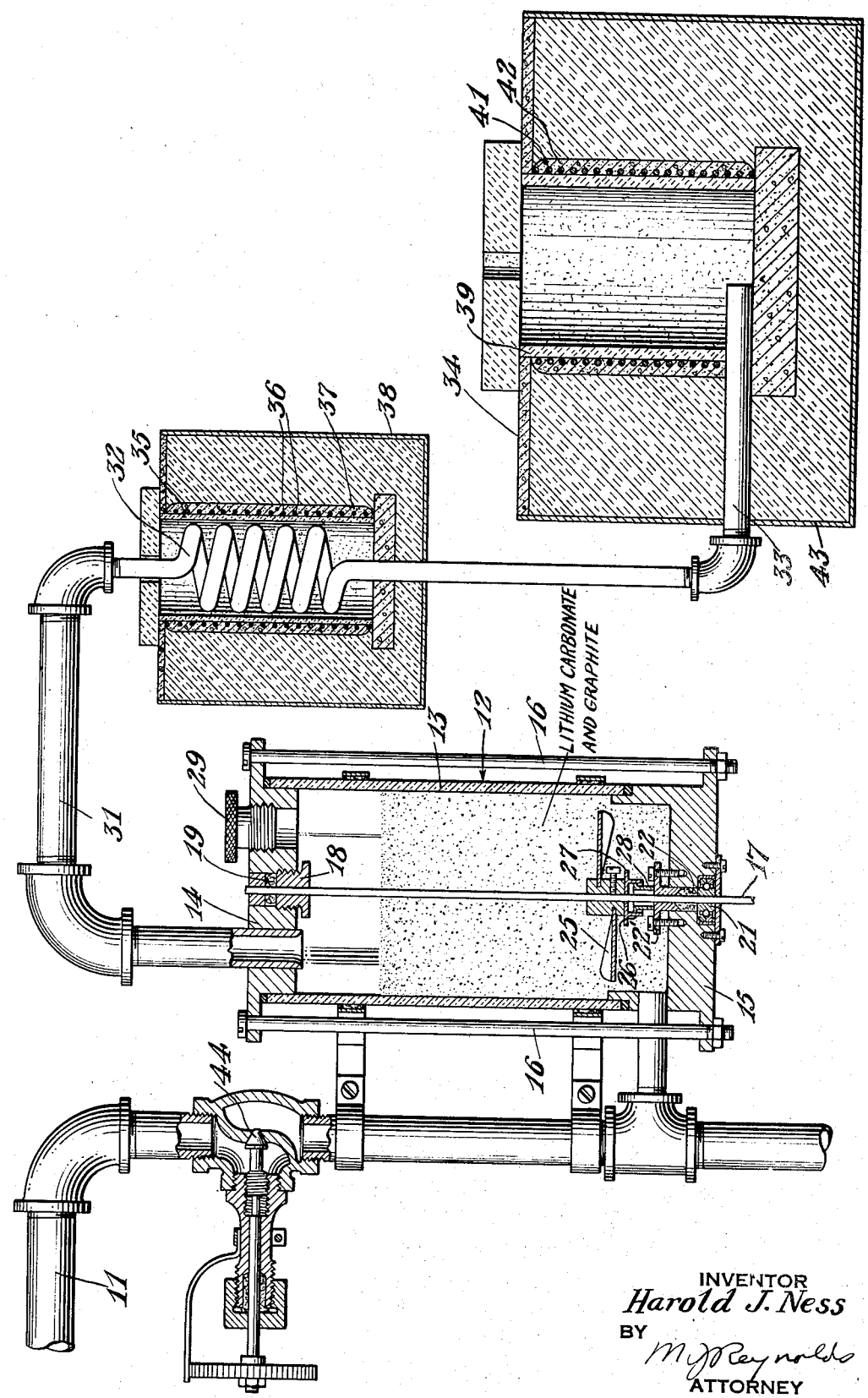
INVENTOR
*Harold J. Ness*
BY
*M. J. Reynolds*
ATTORNEY Patented Nov. 21, 1939

2,181,094

UNITED STATES PATENT OFFICE 2,181,094

METALLURGICAL PROCESS

Harold J. Ness, Bloomfield, N. J., assignor to Nesaloy Products, Inc., New York, N. Y., a corporation of New Jersey Application May 19, 1937, Serial No. 143,411
Renewed August 18, 1939

13 Claims. (Cl. 75—20)

This invention relates to the production of a lithium containing atmosphere in furnaces and more particularly to the creation of such atmosphere from powdered compounds of lithium.

In a copending application Ser. No. 79,968, filed May 15, 1936, I have disclosed a method of producing a lithium containing atmosphere in a furnace by introducing in the furnace a powdered lithium compound, such as the carbonate, fluoride or chloride of lithium, preferable either mixed with the air or fuel, and under the conditions existing in gas or oil fired furnaces, such compounds are reduced, at least in part, to metallic lithium, the spectrum of the furnace gases showing a strong lithium line.

While the present invention is equally applicable to the production of a lithium containing atmosphere in a gas or oil fired furnace, one of the primary objects of the invention is the provision of a process which is particularly suitable for the production of a lithium containing atmosphere in an electric, muffle or other furnace in which carbon monoxide is not ordinarily present in said atmosphere.

Another object is to provide a process which will enhance the reduction of the lithium compounds to lithium metal under conditions prevailing in either electric or fuel fired furnaces.

Another object is to produce a novel mixture more suitable for the production of such lithium containing atmosphere than the lithium compounds alone.

Other objects and advantages of the invention will hereinafter appear.

The present invention is based upon the discovery that lithium compounds, such as the carbonate, chloride, fluoride or hydroxide, when subject to heat in the presence of carbon monoxide will liberate free metallic lithium. The reaction is apparently first the formation of lithium oxide which reacts with carbon monoxide as follows:

$$2Li_2O + CO = Li_2CO_3 2Li$$

In the usual oil or gas fired furnace, the furnace gases contain sufficient carbon monoxide to react with lithium oxide, introduced therein either as a hydroxide or as a carbonate or other compound of lithium to effect the liberation of a substantial amount of lithium metal and the furnace atmosphere in which such lithium metal has been formed is useful in the production of copper-lead alloys, the deoxidation of copper, the production of steel, the preventing of oxidation and scaling of iron or steel during various heat treatments thereof and for a variety of other purposes.

The present invention is concerned with facilitating the formation of lithium metal in furnace atmospheres by insuring the presence of a sufficient supply of carbon-monoxide in such atmospheres. In electric furnaces where there normally is no carbon monoxide present, I supply the same either in the form of carbon monoxide gas or a gas rich therein or by introducing solid carbon, as for instance, graphite, lamp black, coke, etc., either alone or mixed with the lithium compound.

When carbon monoxide gas or a gas rich therein is employed, it may be used as a carrier for the compounds, the lithium compound or a mixture of the compound with powdered carbon being introduced into the gas stream in any desired manner. If solid carbon is employed, the carbon, in the form of graphite, lamp black, charcoal, etc., may be placed in the furnace in either powdered or coherent form, or the furnace walls or other heated portions of the furnace may be composed of graphite. Preferably, however, I mix powered carbon with the lithium compounds, in the desired proportion and introduce the mixture of powdered materials into the furnace. For this purpose I may enclose the powdered mixture in a suitable container and pass gas, such as air, carbon monoxide, etc., therethrough in such manner that it becomes laden with the mixture. The gas so laden may then be introduced into the furnace.

In order that the invention may be more fully understood reference is had to the accompanying drawing, in which the single figure illustrates an apparatus for mixing gas and powdered material and for introducing the gas into a furnace.

The gas is conducted from any suitable source through a line 11 into the base of a container 12 in which I provide a mixture of powdered carbon, preferably graphite, and a compound of lithium, such as the carbonate thereof. The container 12 consists of a cylindrical tube 13, preferably of glass, a flanged upper closure member 14 and a flanged lower closure member 15, the members 14 and 15 being clamped against the ends of the tube 13, with suitable interposed gaskets, by the bolts 16. Extending axially through the container 12 is a shaft 17 journaled at its upper end in a bearing 18 rendered substantially air tight by the packing gland 19. The shaft 17 is journaled at its lower end in a ball bearing 21. The lower bearing 21 is also provided with a gland 22. The shaft 17 is connected through a suitable flexible coupling (not shown) to the shaft of a driving motor (not shown).

Mounted upon the shaft 17 near the lower end of the container 12 is a set of blades 25 adapted on revolution of the shaft to agitate and raise the powered material. In order to prevent entrance of the powdered material into the bearing 21, a flange 26 is provided on the under side of a circular plate 27 carried by the shaft 17, the flange 26 fitting closely about an upstanding flange 28 secured to the gland packing member 22'. A removable screw 29 provides entrance to the container for filling.

A conduit 31 extends from the top of the container 12 to a preheating coil 32. The lower end of the coil 32 is connected to a conduit 33 extending into a furnace 34. The coil 32 is contained in a small electric furnace comprising a refractory tube 35 surrounded by a helix 36 of resistance wire embedded in refractory cement 37, all of which is enclosed in a container 38 packed with heat insulating material. The electric furnace 34 is also shown as comprising a refractory cylinder 39 wound with resistance wire 41 embedded in refractory cement 42 and enclosed in a container 43 packed with heat insulating material.

A valve 44 controls the admission of gas to the container 12.

The blades 25 continuously agitate the powdered material in the container 12 and exert a lifting action thereon which prevents the formation of openings through the mass of powder. The gas in passing through the container 12 becomes laden with the mixture of powdered material and conveys the same through the conduit 31, heating coil 32 and conduit 33 into the furnace 34. The construction and operation of the apparatus for mixing air or other gas and powdered material is more fully set forth in my copending application Ser. No. 209,885, filed May 25, 1938, and entitled "Atomizing device for pulverulent material." Due to the heat generated in the preheating coil 32 and electric furnace 34, the lithium compound is reduced to the oxide form, and the lithium oxide is then reduced to metallic lithium either by the carbon or by the carbon monoxide resulting from the partial oxidation of the powdered carbon in accordance with the reaction given above. The lithium containing atmosphere so produced is useful, as stated, in the production of copper-lead alloys, and numerous other metallurgical processes. In view of the fact that a considerable quantity of gas is required to carry the mixture of powdered materials into the furnace, I provide the gas preheater 32 to prevent chilling of the furnace 34.

While I prefer to mix the carbon with the lithium compound, prior to introduction of the compound into the furnace, this is not essential, since the lithium compound and the carbon may be introduced separately, if desired, as by using separate receptacles 13 for each, the gas laden with carbon and that laden with the lithium compound being conducted into the furnace 34 either through the same or separate conduits. If desired the carbon required for the reaction may be obtained from the furnace itself, as for instance, by using a graphite crucible therein or by forming the cylinder 39 of graphite, in which case the resistance coil 41 must be insulated therefrom as by an interposed mica sheet. If the carbon is included in the furnace, the receptacle 12 may contain only the lithium compound.

A mixture for the chamber 12 which I have found satisfactory, is lithium carbonate 80% and graphite 20%. The gas may be heated to about 1600° F. in the preheater 32, although considerable variation in this figure is permissible.

In place of using solid carbon, either mixed with the lithium compound, or in the furnace, carbon monoxide or a gas containing carbon monoxide may be used, and in such case such gas may be provided through the conduit 11 to convey the powdered compound into the furnace.

Various modifications of the apparatus described for introducing the lithium compound and the carbon monoxide evolving material into the furnace may be devised and various other methods of introducing such materials will occur to those skilled in the art and therefore, it is to be understood that the embodiments described are not to be considered in a limiting sense but only by way of example.

I claim:

1. The method of creating an atmosphere containing lithium metal in a furnace or the like comprising mixing a pulverulent compound of lithium with powdered carbon, introducing said mixture with oxygen or an oxygen containing gas into a furnace and maintaining a sufficient temperature in said furnace to effect a reduction of the lithium compound to metallic lithium.

2. The method of creating an atmosphere containing lithium metal in a furnace or the like comprising mixing a pulverulent compound of lithium with powdered carbon, passing gas through the mixture and causing the same to become laden with the mixture, introducing said powder laden gas into a furnace and maintaining a sufficient temperature in said furnace to effect a reduction of the lithium compound to metallic lithium.

3. The method of creating and maintaining an atmosphere containing lithium metal in a furnace or the like comprising mixing pulverulent lithium carbonate and powdered carbon, substantially continuously introducing said mixture into a furnace in the presence of oxygen and maintaining a sufficient temperature in said furnace to effect a reduction of the lithium compound to metallic lithium.

4. The method of creating at atmosphere containing lithium metal in a furnace or the like comprising mixing pulverulent lithium carbonate and powdered carbon, passing air through the mixture and causing the same to become laden with the mixture, introducing said powder laden air into a furnace and maintaining a sufficient temperature in said furnace to effect a reduction of the lithium compound to metallic lithium.

5. The method of creating an atmosphere containing lithium metal in a furnace or the like comprising mixing pulverulent lithium carbonate and powdered carbon in the proportion of about 80% of the former and 20% of the latter, passing a gas containing oxygen through the mixture while agitating the same to cause said gas to become laden with the mixture, introducing said gas into a furnace and maintaining a sufficient temperature in said furnace to effect a reduction of the lithium compound to metallic lithium.

6. The method of creating an atmosphere containing lithium metal in a furnace or the like, comprising providing a supply of carbon in the furnace, introducing into the furnace a quantity of a compound of lithium admixed with gas and maintaining a sufficient temperature in the furnace to effect a reduction of the lithium compound to metallic lithium.

7. The method of creating an atmosphere containing lithium metal in a furnace, comprising mixing a pulverulent compound of lithium with powdered carbon, passing gas through the mixture and causing the same to become laden with the mixture, heating said powder laden gas, introducing said heated powder laden gas into a furnace and maintaining a sufficient temperature in said furnace to effect a reduction of the lithium compound to metallic lithium.

8. The method of creating an atmosphere containing lithium vapor, in a furnace or the like, comprising agitating a powdered compound of lithium, passing a gas therethrough which under the conditions prevailing in the furnace exerts a reducing action on said compound or on a subcompound thereof produced in the furnace, and conducting said gas laden with said compound into the furnace.

9. The method of creating an atmosphere containing lithium vapor, in a furnace or the like, comprising mixing a powdered compound of lithium with a gas which under the conditions prevailing in the furnace exerts a reducing action on the compound or on a subcompound thereof produced in the furnace and conducting said gas laden with said compound into the furnace.

10. The method of creating a lithium containing atmosphere in a furnace comprising mixing a compound of lithium with a gas containing carbon monoxide, introducing the mixture into the furnace and producing sufficient heat therein to effect a reduction of said compound to metallic form.

11. The method of creating a lithium containing atmosphere in a furnace comprising mixing a compound of lithium with a material which contains carbon, introducing the mixture into the furnace with oxygen and producing sufficient heat therein to cause the formation of carbon monoxide in said furnace and utilizing said carbon monoxide to effect a reduction of said compound, at least in part, to metallic form.

12. In a furnace having an atmosphere produced by the combustion of a mixture of a carbonaceous material and oxygen, the method of producing lithium in said atmosphere which comprises introducing into the furnace while it is at an elevated temperature a compound of lithium admixed with one of the ingredients of the mixture.

13. In a furnace having an atmosphere produced by the combustion of a mixture of a carbonaceous material and oxygen, the method of producing lithium in said atmosphere which comprises maintaining the furnace at an elevated temperature and introducing a lithium compound into the furnace atmosphere by means of a stream of gas.

HAROLD J. NESS.